Dec. 23, 1941.  F. NEUKIRCH  2,267,416
FLARED FITTING
Filed Dec. 18, 1939

INVENTOR.
Frank Neukirch
BY Bair & Freeman
ATTORNEYS

Patented Dec. 23, 1941

2,267,416

UNITED STATES PATENT OFFICE 2,267,416

FLARED FITTING

Frank Neukirch, Chicago, Ill., assignor to The Imperial Brass Manufacturing Company, Chicago, Ill., a corporation of Illinois Application December 18, 1939, Serial No. 309,853

2 Claims. (Cl. 285—86)

This invention relates to fittings for relatively soft tubing and particularly a type of fitting generally designated as a flared fitting.

Among the objects of my invention is the provision of a new and improved flare type fitting which forms a positive tight seal for tubing containing liquids and gases under relatively high pressure.

Another object of my invention is to provide a new and improved flared fitting wherein a double sealed surface is formed at the flare so that if one of the sealed surfaces should be defective in preventing the leak of fluid the other will remedy the deficiency and render the joint tight.

A further object of my invention is to assure a leakless flared style of fitting under circumstances where the flared portions of the fitting itself may be slightly defective and fail to completely seal against the flare of the tubing, the seal being accomplished by distorting the portion of the relatively ductile flared portion of the tubing into an auxiliary recess forming a secondary sealed surface beneath the normal flared face of the fitting.

Still another object of my invention is the provision of a new and improved flared fitting which provides an annular depression in the flared portion of one of the fitting members which is used to plow the metal forming the flare into an auxiliary ring of contact with itself to produce a tight seal to minimize refacing of the fitting made necessary by dents and abrasions on the flared surface and to relieve tension and stress at the base of the flare on the tubing where it springs outwardly from the tubing wall and thus provide a stronger and less readily broken joint.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1:
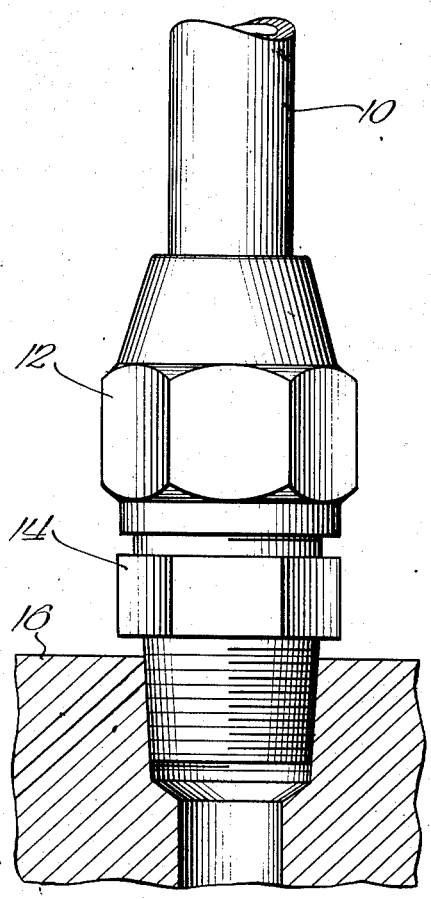
Figure 1 is an elevational view of an assembly set.

In making up flared fittings, which are commonly designated SAE type of fittings, the usual procedure is to flare the end of a piece of tubing such as copper or aluminum tubing at an angle of substantially 45 degrees and then to clamp the flared end of the tubing between male and female coupling members in order to form a fluid-tight joint.

The male coupling member customarily is inserted within the flared end of the fitting and by virtue of pressure against the inner surface of the flare seals the joint. Fittings of this kind are frequently used under rather excessive pressures so that unless the joint is very efficiently formed leaks may later occur.

These leaks are especially objectionable where the fitting is designed to hold against highly volatile and penetrating refrigeration gases, for example.

One of the difficulties in providing an absolutely fluid-tight joint is due to the fact that when the flares are made upon the tubing, sometimes small chips of metal remain lodged upon the flare and become partially embedded in it when the fitting is made up. These chips naturally form slight humps and frequently prevent an effective seal on all sides.

Another difficulty encountered in making a tight seal is due to the presence of chatter marks on the tapered portion of the male fitting. When the tapered portion is cut there are times when a slight vibration in the machine will produce ridges running lengthwise with respect to the flared end. Then when the fitting is used to make up a joint the recesses formed by the chatter marks act as tiny canals permitting direct passage of the fluid outward through an otherwise tightly sealed surface. Even though a joint may be screwed up tight, these somewhat longitudinal ridges serve to shear part of the surface of the tubing flare since the surface is rotated relative to the flare and the metal thus sheared off does not have a suitable opportunity to fill all the possible depressions in the face resulting in an inefficient joint. Dropping the fitting on a hard object or permitting the fittings to strike against each other during shipment may also mar the flared surfaces and cause a defective joint to be formed. This is especially harmful when the flared fitting forms the outlet on a valve, some of which are relatively expensive to replace. While poorly formed faces can be remedied by refacing the flare it requires an extra expenditure of time and labor with good results not necessarily a certainty.

When fittings of any of the above described former types are uncoupled, and then remade the deficiencies originally existing are frequently magnified.

In order to form a practically fluid-tight joint in the presence of these possible difficulties, the applicant has provided a configuration running counter to the direction of ridges and depressions formed by chatter marks and abrasions which is greater in depth than the depth of such marks. The sealing configuration thus provided is annular in shape and when one side is brought completely into contact with metal plowed up by it during assembly of the coupling there is formed a dam or secondary seal of material effectively sealing the joint against leaks due to any of the numerous causes heretofore described. A fitting made with the novel secondary seal herein described assures a tight seal at all times and renders unnecessary frequent refacing of the fittings should they become damaged.

Figure 2:
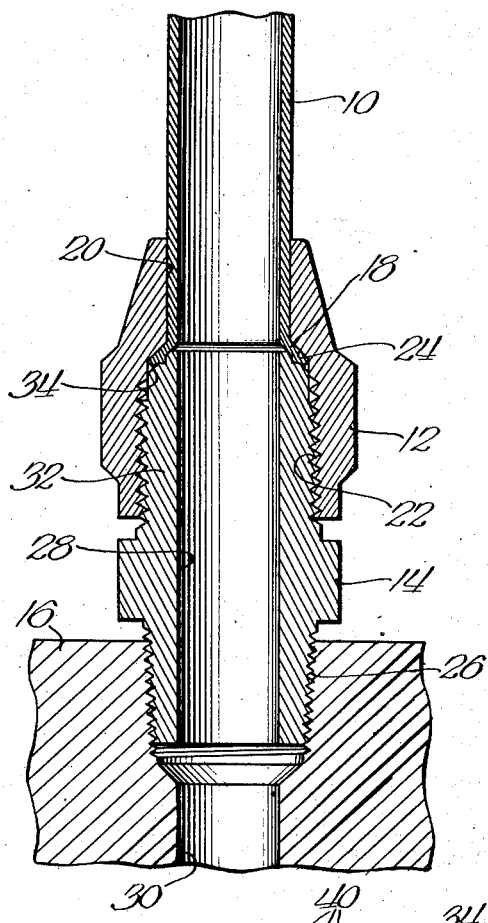
Figure 2 is a longitudinal section of the fitting shown in Figure 1.

An embodiment of my invention is shown in the drawing wherein a length of copper tubing 10 is coupled by a flared nut 12 forming a female member and a flared fitting 14 forming a male member. The fitting by way of example is shown secured in a base 16, but might as readily form an outlet or inlet member of a valve. The tubing, as best seen in Figure 2, is shown with one end formed in a flare 18 secured within the nut 12. In turn the nut is provided with a passage 20 for the tubing, a threaded recess 22 and a flared face 24 at an angle of substantially 45 degrees joining the passage 20 with the threaded recess 22.

The fitting 14 is provided at the lower end with a pipe thread 26 for securing it within the base 16. A passage 28 through the fitting communicates at one end with the tube 10 and at the other end with a passage 30 in the base. The fitting is provided additionally with a threaded projection 32 designed to be received within and engage the threaded recess 22 of the female member when the device is assembled.

At the inner end the projection is provided with a tapered face 34 complementary to the flared face 24 and designed to hold between those faces the flared end 18 of the tubing.

Figure 3:
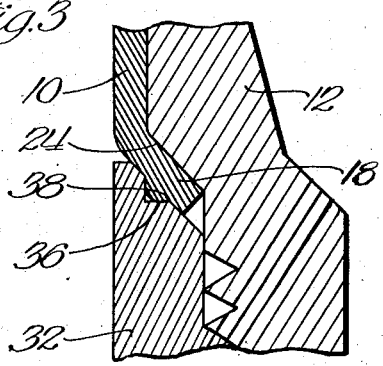
Figure 3 is an enlarged detail showing a fragment of the double seal provided, in section.

In addition, the tapered face 34 is provided with an annular depression 36 running completely around the face and extending to a depth somewhat less than the thickness of the flared end of tubing. The depression, as shown in Figure 3, has a right angular shape with the 90 degree angle at the apex, one side being parallel to the axis of the fitting and the other side perpendicular thereto. It is contemplated, however, that the depression may be of an angular shape greater or less than a right angle within reasonable limits or might be rounded so long as it has sufficient depth and provides an edge 38 which can plow into the metal forming the flare of the tubing.

Figure 4:
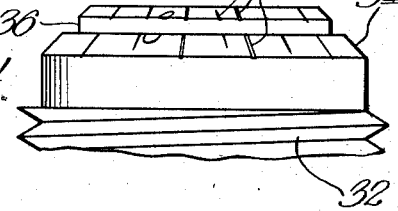
Figure 4 is a fragmentary elevational view of the flared end of a fitting marred with chatter marks and score marks and provided with the novel sealing device.

The tapered face 34 is likewise shown in Figure 4 with an annular depression 36 formed therein cutting across a series of substantially longitudinal depressions and ridges 40 of a type commonly caused by chattering of the piece or of the tool when the tapered face is formed. Other marring and indented blemishes on the flared surfaces are likewise rendered ineffective to cause leaky joints.

To assure a seal the annular depression is cut deeper than the maximum depth of the chatter marks, or other abrasions.

In operation, one of the nuts 12 is placed over a length of copper tubing and then a flare is formed at the end. The flare is then placed over the end of a projection 32 on the male member and the nut screwed into place. As the flare and tapered surfaces are finally pressed against the adjacent surfaces of the tubing the edge 38 of the depression in the tapered face of the male member plows slightly into the adjacent face of the tubing flare and forces a portion of the somewhat ductile metal into the depression 36.

It is not necessary to completely fill the depression so long as the metal has contact with the sides of it beneath the surface of the tapered face. This plowed-up metal thereby forms a seal in addition to the seal between the tapered face and the face of the flare so that if there are projections or indentations upon the face of the flare which might otherwise interrupt a perfect sealing of the tapered faces, nevertheless a positive seal will be formed within the depression itself. This seal is cross-wise to the likely course of escaping fluid and forms an effective dam.

In addition, by providing a relief such as the depression 36 adjacent the base of a flare on the end of a piece of tubing space is provided for excess metal displaced by the flaring operation so that strains and stresses set up at the base of the flare are thereby relieved to a degree rendering the tubing less likely to breakage at the flare.

There has thus been provided a flared fitting supplying a double seal against leakage and also one which is relatively simple and inexpensive to manufacture and which is directly interchangeable with all of the other similar standard fittings now on the market.

Moreover, the novel seal described herein makes it possible to assemble, take apart, and reassemble a fitting innumerable times and secure a tight seal each time regardless of irregularities or grit present on the face of the flare. Tests have shown that repeatedly made joints of this type are many times superior to regular flared joints in holding extremely thin gases under relatively high pressures.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a coupling for flared tubing having an initially flared end with continuous flat flares on both sides thereof of substantialy the same shape as in the finished coupling, the combination of a female member having a passage therethrough for tubing, a male member adapted to be threadably engaged with the female member, an annular flat tapered male portion in one of said members, and an annular flat tapered female portion in the other member substantially parallel to the said male portion throughout its length in contact with one side of said flare throughout the length of said flared portion forming thereby an annular frusto-conical pocket closed at the outer end, the walls of said pocket being smooth surfaced and parallel throughout their length for respectively contacting both sides of the flare on the tubing to form a sealed joint, means for forming a secondary seal comprising an annular recess in the flat face of said tapered male portion intermediate the ends of said annular frusto-conical pocket forming a relatively sharp corner at its junction with said flat conical face and leaving a smooth surfaced portion on the flat conical face of the male portion on both sides of the recess, said recess being partially filled with a quantity of metal of said flare when the parts are assembled forming thereby said secondary seal in said joint intermediate portions of the surface seal.

2. In a coupling for flared tubing which can be repeatedly made and remade, adapted for use with a tube initially having a flare of substantially fixed shape during said making and remaking with substantially flat faces continuous in angular direction from the base of the flare to the outside end thereof and a member having a threaded recess and a frusto-conical flared face uniform in character throughout its surface area at the interior thereof for holding a flared end of tubing, said face being continuous in angular direction throughout its length, a second member having a threaded projection thereon receivable into the first member, a frusto-conical flared face at the interior end of the projection having the same continuous angular direction as said first flared face and substantially parallel thereto throughout the contacting area and having an assembled position within a flared end of tubing for sealing the tubing in place, the flared face on said projection including means forming a secondary seal comprising an annular recess intermediate the base of the frusto-conical flared face and the outside end thereof, said recess when the coupling is assembled being partially filled with the material comprising the flare and having a corner thereof embedded in said material forming thereby the secondary seal adjacent the flared face of said second coupling member, the bottom of said recess being spaced from the axis of the tube a distance not less than the distance from said axis to the innermost edge of said recess and not greater than the distance from said axis to the outermost edge of the recess.

FRANK NEUKIRCH.